United States Patent [19]

Segal

[11] 4,441,762
[45] Apr. 10, 1984

[54] DECORATIVE WHEEL COVERING FOR PROVIDING A MULTIPLICITY OF DESIGNS

[75] Inventor: William J. Segal, Culver City, Calif.

[73] Assignee: Orion Industries, Inc., Compton, Calif.

[21] Appl. No.: 367,420

[22] Filed: Apr. 12, 1982

[51] Int. Cl.³ .............................................. B60B 7/04
[52] U.S. Cl. ................................. 301/37 R; 301/37 P; 301/37 S
[58] Field of Search ................. 301/37 R, 37 P, 37 L, 301/37 N, 37 S, 37 SA, 37 SS, 108 A, 108 R, 108 SC; 40/587, 591

[56] References Cited

U.S. PATENT DOCUMENTS

| 2,629,957 | 3/1953 | Lyon | 301/108 R |
| 3,579,408 | 5/1971 | Dowhan | 301/37 R |
| 3,602,550 | 8/1971 | Patane et al. | 301/37 SA X |
| 3,791,336 | 2/1974 | Zdebski | 40/591 X |
| 4,209,230 | 6/1980 | Perkins | 301/37 SA X |
| 4,296,936 | 10/1981 | Iwamoto | 301/37 SA X |

FOREIGN PATENT DOCUMENTS 282199  9/1970  U.S.S.R. .......................... 301/37 R

Primary Examiner—Robert B. Reeves
Assistant Examiner—Russell D. Stormer
Attorney, Agent, or Firm—Fulwider, Patton, Rieber, Lee & Utecht

[57] ABSTRACT

A decorative wheel cover is devised for an automotive wheel hub which allows for the arbitrary multiplication of decorative designs displayed by the wheel covering. The wheel cover includes a rim which is coupled to the wheel and a plurality of decorative segments which couple to the rim. Each of the segments is reversible or may be displaced with respect to each other to vary the pattern formed by the segments.

10 Claims, 15 Drawing Figures

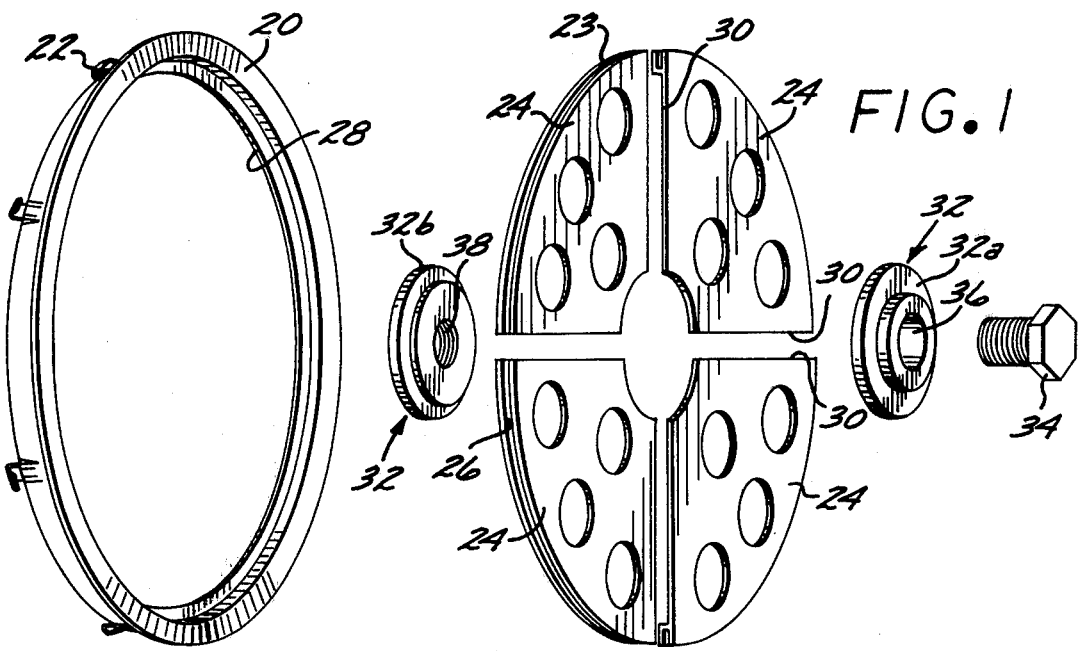
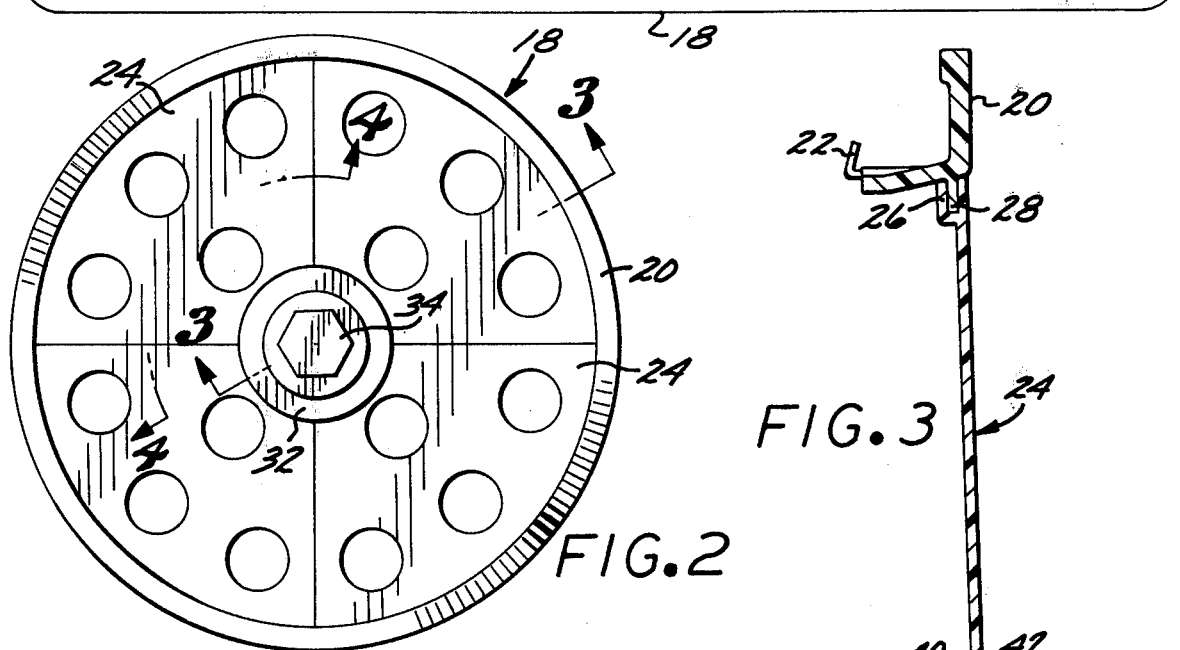
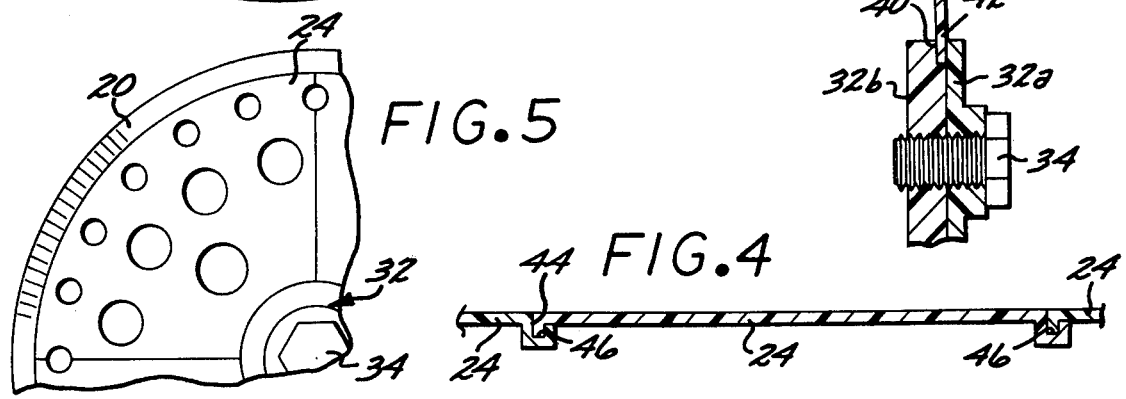

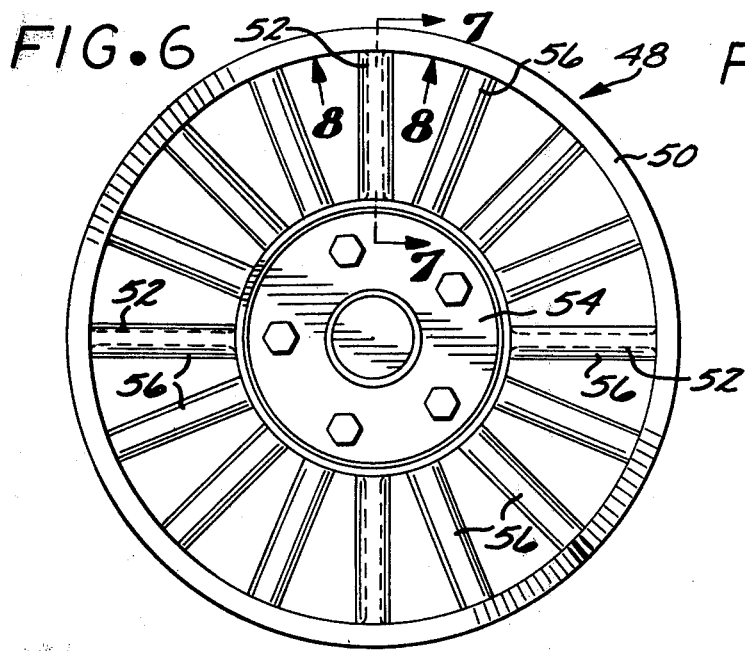
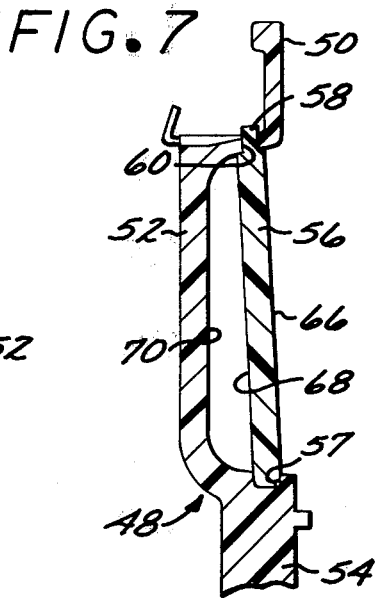
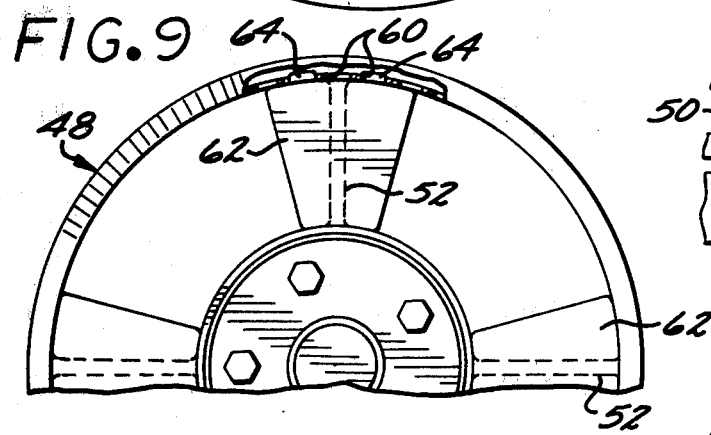
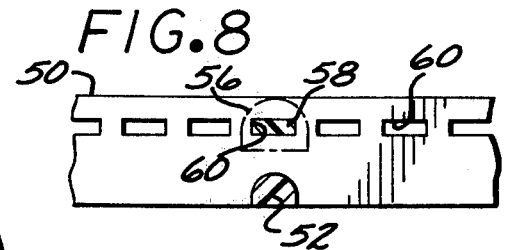
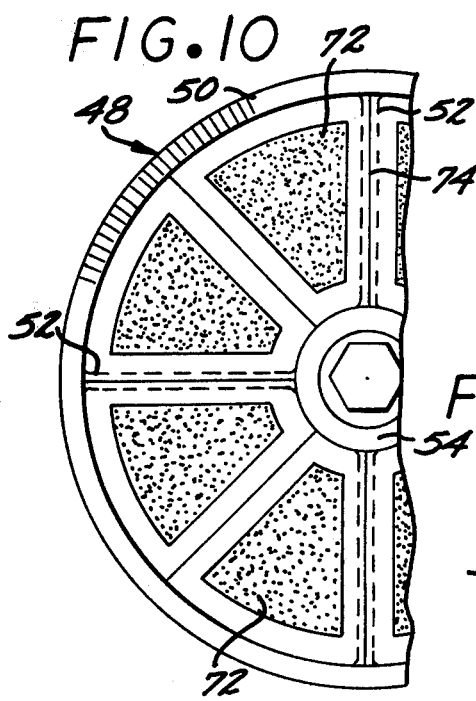
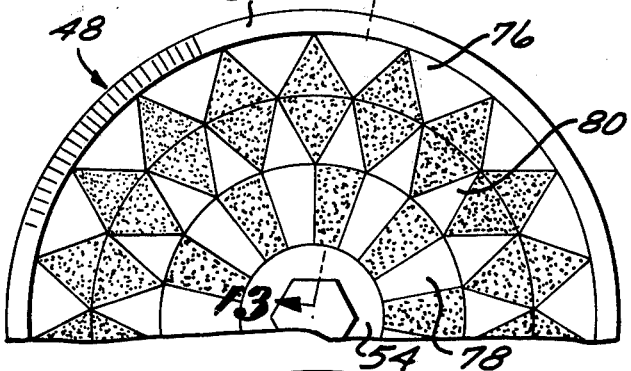
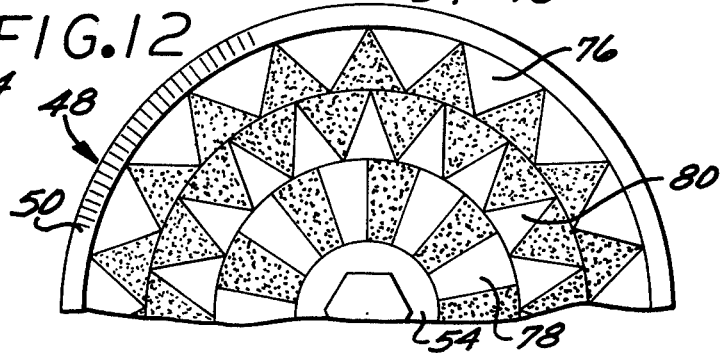

4,441,762

DECORATIVE WHEEL COVERING FOR PROVIDING A MULTIPLICITY OF DESIGNS

BACKGROUND OF THE INVENTION

1. Field of the Invention

The present invention relates to the field of automotive accessories, and in particular relates to decorative wheel coverings.

2. Description of the Prior Art

Decorative wheel coverings are well known to the art and are available with a large number of varying patterns and designs. Generally, decorative wheel coverings differ only in the manner in which they are attached to the wheel hub or in the design which they incorporate, and typically will incorporate a single design or pattern which is unalterable.

To allow a degree of variability of design, coverings have been devised which allow for the incorporation of an ornamental insert into the wheel covering. For example, Lyon, "Ornamental Insert for Wheel Structure", U.S. Pat. No. 2,629,957 shows a center, mini-hubcap which is inserted into the center of the wheel covering to allow each wheel covering to include a badge carrying the trademark or emblem of a specific automobile manufacturer.

In addition to center badges or emblems disposed in a wheel covering, prior art designs have been devised which allow for a degree of interchangeability of trim on a wheel covering by permitting the attachment of ornamental plates on top of the wheel covering, see for example Golze, "Vehicle Wheel Trim", U.S. Pat. No. 3,791,700. In addition, a device has been made where an ornamental plate is centrally fastened to a wheel covering to provide an overlay contrasting in color or texture to the underlying decorative cover, see for example Spisak, "Plastic and Metal Wheel Trim Assembly", U.S. Pat. No. 4,295,685.

However, each of the prior art designs suffer from the defect that the ornamental design is essentially unalterable or alterable only to the extent that additional ornamental parts can only be inserted as a central emblem or attached as an overlay to a single, underlying and pre-existing ornamental pattern incorporated in the wheel covering. What is needed is a means whereby the wheel covering itself may be designed to allow for a multiplicity of arbitrarily devised ornamental patterns according to the desire of the user, and devised in such a manner that the patterns may be arbitrarily created by the user without any need for special skills or tools.

BRIEF SUMMARY OF THE INVENTION

The present invention is a decorative cover for an automobile wheel. The cover is comprised of a rim which includes means for engaging the rim to the wheel and is comprised of a plurality of decorative segments. The decorative segments are each coupled to the rim and are selectively disposed in the rim so that by selective disposition of the plurality of the segments with respect to the rim and with respect to each other, the number of decorative patterns created by the segments may be arbitrarily varied.

Each of the segments is reversible with respect to the rim and with respect to each other. Each side of the segments are provided with a decorative pattern. Reversal thereby multiplies the number of patterns which can be created by insertion of the segments in the rim.

A plurality of sets of decorative segments may thus be disposed in the rim to allow the user to arbitrarily switch between totally distinct decorative patterns, and to create additional patterns by interchanging segments among the sets.

In one embodiment, the rim may be in the form of a ring with the decorative segments coupled between the rim and a separate center element or hub which engages the segments.

In another embodiment, the rim may have a circumferential portion integrally connected to a center portion by means of an intermediate portion, such as a dish shape or spoked shaped rim into which the segments are disposed. In the embodiment where the rim is dish shaped, the intermediate portion of the rim may itself be provided with a decorative pattern which is revealed when one or more of the overlying segments are removed.

These and other embodiments of the present invention are better understood by reviewing the following Figures wherein like elements are referenced by like numerals.

BRIEF DESCRIPTION OF THE DRAWINGS

FIG. 1 is a horizontally exploded perspective view of a decorative cover for an automobile wheel embodying of the present invention.

FIG. 2 is a side view of the embodiment of FIG. 1 shown in an assembled state.

FIG. 3 is a cross section of the embodiment of FIG. 1 taken along line 3—3 of FIG. 2.

FIG. 4 is a radial section taken along line 4—4 of FIG. 2.

FIG. 5 is a partial side view of the embodiment of FIG. 1.

FIG. 6 is a side view of a second embodiment of the present invention.

FIG. 7 is a cross section of the embodiment in FIG. 6 taken through line 7—7 of FIG. 6.

FIG. 8 is a horizontal sectional view taken along line 8—8 of FIG. 6.

FIG. 9 is a broken side view of a third embodiment using the rim of FIG. 6.

FIG. 10 is a broken side view of a fourth embodiment using the rim of FIG. 6.

FIG. 11 is a broken side view of a fifth embodiment using interlocking rings.

FIG. 12 is a broken side view of the embodiment illustrated in FIG. 11 wherein one of the rings has been rotated with respect to the others.

DETAILED DESCRIPTION OF THE PREFERRED EMBODIMENTS

Figure 13:
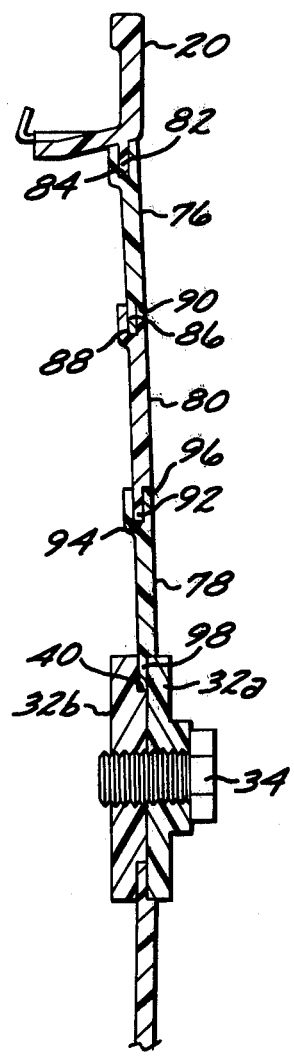
FIG. 13 is a sectional view taken through lines 13—13 of FIG. 11.

With the decorative cover of present invention the composition of the wheel cover itself may be arbitrarily altered to create a multiplicity of differing patterns. A plurality of interlocking segments are disposed within a rim. The rim in turn is coupled to the wheel flange. By reversal of segments, by insertion of differing segments, by differing combinations of inserted segments, by selecting segments from different sets, and by the selective removal of segments, the number of patterns which can be created is substantially multiplied.

The invention and its various embodiments may better be understood by viewing FIGS. 1–5 wherein one embodiment is illustrated. The wheel cover includes a rim 30, decorative segments 24 and a center element 32. In particular, in FIG. 1 rim 20 is shown as including a plurality of spring clips 22 disposed on the inner periphery of rim 20, which clips 22 are arranged and configured to resiliently engage the wheel flange (not shown) of the automobile to which the decorative cover of the present invention is attached. Spring clips 22 are shown only for tne purposes of illustration, and it must be understood that many other means may be employed as are well known to the art for attaching rim 20 to the wheel. A plurality of decorative segments 24 are disposed in rim 20. The elements of the wheel covering are shown in FIG. 1 in exploded view wherein four quarter-plate segments 24 are shown in a spaced relationship to the right of rim 20, as viewed in FIG. 1. Segments 24, as shown in greater detail in FIGS. 3 and 4, are designed to couple with each other as well as to rim 20.

Segments 24 are coupled to rim 20 by means of a groove 26, defined in the circumferential edge 23 of segments 24, and a mating edge 28 formed along the inner periphery of rim 20. Segments 24 also interlock with each other by a tab and groove combination formed along radial edges 30 of segments 24, which tab and groove combination is better shown in FIG. 4 as described below. Segments 24 are also joined together in the embodiment of FIG. 1 by a center element 32 which serves as a central hub, whereby the plurality of segments 24 are securely bound together. Center element 32 is in turn comprised of two halves, elements 32a and 32b. Center elements 32a and 32b in the embodiment of FIGS. 1–5 are securely bound together by bolt 34, which is disposed through a body hole 36 defined in center element 32a and threaded into threaded hole 38 in center element 32b.

When assembled, decorative cover 18 appears as shown in FIG. 2, wherein the decorative pattern provided on one surface of segments 24 forms a completed pattern as illustrated.

FIG. 3 is taken through section 3—3 of FIG. 2 and shows the means by which segments 24 are coupled to rim 20. Segments 24 and rim 20 are coupled, as shown in FIG. 3, by means of edge 28 which runs on the inner circumference of rim 20 and a mating circumferential groove 26 formed on the outer circumferential edge of segments 24. The opposing end 42 of each segment 24 is disposed between center elements 32a and 32b in a circumferential shoulder 40 defined in center element 32b. The thickness of segment 24 may be slightly greater than the depth of shoulder 40, thereby allowing center elements 32a and 32b to tightly compress end 42 of segment 24 between them.

The mutual coupling of segments 24 is best shown in FIG. 4 which is taken through radial section 4—4 of FIG. 2. Each segment 24 is coupled with an adjacent segment by means of a tab and groove combination, shown in FIG. 4. The combination is comprised of tab 44 arranged and configured to mate within a radially extending opening, such as groove 46 which is defined in the edge of an adjacent segment 24. Thus, each segment 24 includes one radial edge, formed in the shape of tab 44, and an opposing edge which defines a groove 46.

The assembly of the wheel cover of the present invention may now be understood. Segments 24 are individually inserted into rim 20. The lower segments 24 are individually disposed in rim 20 by inserting edge 28 of rim 20 into groove 26. After the first segment is inserted, the second segment is similarly inserted into rim 20 and tipped to allow tab 44 and groove 46 on radial edges 30 of adjacent segments 24 to be simultaneously engaged. Additional segments are inserted one by one until only one segment remains to be inserted. Segments 24 are of flexible material, such as plastic, so that the last segment can be slightly deformed to allow tab 44 and groove 46 on that segment to engage the tab and groove on the adjacent segments. Once radial edges 30 of the last segment are substantially engaged to adjacent segments 24, groove 26 is snapped into engagement with the adjacent portion of edge 28 of rim 20 thereby completing assembly of the covering. Disassembly of segments 24 proceeds in the reverse order. After each of the segments 24 have been assembled, center element 32(b) and 32 (a) are put in place and secured together by means of bolt 34.

FIG. 5 illustrates a partial plan view of the embodiment of FIGS. 1–4 wherein each segment has been reversed to expose a distinct decorative pattern to the viewer as seen in FIG. 5. In other words, each segment 24 has one pattern formed on one side as seen in FIG. 1, and a distinct pattern on the other side as shown in FIG. 5. The design on the pattern is immaterial for the purposes of the present invention and has been shown in FIGS. 1 and 5 in a very simplified format solely for the purposes of illustration.

The coupling of segments 24 to rim 20 as shown in FIG. 3 and the mutual coupling of segments 24 as shown in FIG. 4 is reversible with respect to rim 20. It is immaterial whether segments 24 are disposed within rim 20 and within center member 32 in a first orientation or reversed. In fact, it is possible that only selected ones of segments 24 may be reversed while others are not. In this case, grooves 46 of adjacent segments 24 will nevertheless interlock, and tabs 44 of adjacent segments will similarly engage each other, albeit not with as secure as an engagement as the tab and groove combination illustrated in FIG. 4. In that case, center member 32 provides sufficient additional coupling between segments 24 to permit selective reversal of any one of segments 24.

FIGS. 6–10 illustrate yet another embodiment of the present invention which is shown in FIG. 6 in plan view as assembled. In this embodiment, rim generally denoted by reference character 48 is comprised of an integral member including a circumferential portion 50, an intermediate portion 52 and a center portion 54, best shown in FIG. 7. In the illustrated embodiment circumferential portion 50 is connected to center portion 54 by four spokes which form intermediate portion 52. Each portion 52 has a width less than the overlying segment 56 which is also formed in the shape of a spoke to give the visual impression of a spoked wheel. However, intermediate portion 52 could also be formed in the shape of a dish, thereby completely filling the space between circumferential portion 50 and center portion 54. Segments 56 are disposed in rim 48 by insertion of a tab 58 into a mating hole or groove 60 provided in circumferential portion 50 of rim 48; and by insertion at the opposing end of segment 56 into an azimuthal slot 57 defined in center portion 54.

FIG. 7 also illustrates another feature of the present invention wherein the multiplicity of patterns may be multiplied. For example, segment 56 may have a first distinctive pattern formed on side 66 and a second distinctive pattern formed on side 68. In addition, in the embodiment where intermediate portion 52 is dish shaped, intermediate portion 52 of rim 48 may have a third distinct decorative pattern formed on surface 70, thereby permitting the pattern to be changed not only by reversing segment 56, but also by selectively removing one or more of the segments to display the underlying decorative pattern on side 70 of intermediate portion 52. Again, it can be easily, seen in FIG. 7 that the means by which segment 56 is coupled to rim 48 is symmetric so that segment 56 may be reversed and inserted using the same coupling in either case.

The engagement of tab 58 in circumferential portion 50 of rim 48 is better shown in plan view in FIG. 8 taken through radial section 8—8 of FIG. 6. A plurality of holes 60 are defined in circumferential portion 50 to allow for the arbitrary placement of segment 56 within rim 48. Segments 56 are made of a resilient material such as plastic or thin gauge metal, which allows the material to be deformed to a degree to permit the snap insertion of tab 58 in holes 60 and the insertion of segment 56 within slot 57. At least one segment 56 is disposed in front of each intermediate portion 52 in the spoked wheel embodiment to create a uniform appearance.

FIG. 9 shows a partially cut-away view of another embodiment wherein a segment 62 is shown with two tabs 58 inserted into selected ones of the plurality of radially extending openings, such as holes 60 in rim 48 of FIG. 6, and wherein segment 62 is in the form of a web-shaped segment. As illustrated in FIG. 9, when segments 62 are disposed in rim 48, adjacent tabs 64 are separated from each other by a distance which spans at least one of holes 60 among the plurality of holes 60 in peripheral portion 50 of rim 48; segment 56 also covers underlying spoked shaped portion 52. However, it must be understood that the particular placement of tabs 64 in rim 48 can be altered without departing from the scope of the present invention, for example, more than two tabs 64 can be provided for each segment 62, or simply one large slot-like tab could be provided on the circumferential portion of segment 62 at a center, circumferential position.

FIG. 10 shows another embodiment using the rim of FIG. 6 wherein a distinct pattern is created by segments 72 coupled to rim 48 so that central portion 52 also embodies a distinguishable pattern. Segments 72 are in the shape of quarter plates similar to segments 24 of FIGS. 1–5 except that segments 72 are coupled to rim 48 in the manner described in connection with FIGS. 6–9. Segments 72 may, but need not, have any means for mutual coupling along their radial edges 74 of the type described in connection with FIG. 4. As in the embodiments of FIGS. 6 and 9, segments 72 cover underlying intermediate portions 52 to give the appearance of a planar pattern.

It may now be readily appreciated by viewing the embodiments of FIGS. 1–10 that rims 20 or 48 may be provided with a plurality of sets of decorative segments wherein each set comprises a reversible decorative pattern. For example, rim 20 in FIGS. 1–5 illustrates a single set of decorative segments. Clearly, additional segments 24 could be provided having an entirely distinct pattern formed on its sides. Because of the interchangeability of the coupling of segments 24, segments from one set can be used in combination with segments from another set to dramatically multiply the number of decorative patterns that can be created by the user without the need of special tools or skills.

Similarly, rim 48 of FIGS. 6–10 show three sets of segments, namely segments 56, 62 and 74 used in combination with rim 48. Although the segments from each of these sets are quite distinct, and may not be combined for aesthetic reasons, the design allows segments from one set to be used in combination with segments of any one of the others. Clearly, it is within the scope of the present invention that more aesthetically compatible sets of segments than those shown in FIGS. 6, 9 and 10 could be provided for use in combination with rim 48. Again, the number of patterns which can be created by the user without need of special tools or skills is dramatically multiplied by the present invention.

FIG. 11 illustrates in side view another embodiment of the present invention wherein each of the decorative segments are comprised of a ring of varying diameter. For example, as shown in FIG. 11, first ring 76 has a maximum diameter and subsequent rings have decreasing diameters until the last ring 78 is coupled to center portion 54 of rim 48. In one embodiment, rim 48 of FIG. 11 may be constructed according to the teaching of FIGS. 6–10, wherein rim 48 is an integral member, and outermost ring member 76 is coupled to rim 48 by the hole and tab combination illustrated in FIGS. 8 and 9 or groove and tab combination of FIGS. 1 and 3. The next smaller ring 80 may have an edge which interlocks with outer ring 76 in the manner shown in FIG. 4, with the innermost ring member 78 inserted into center portion 54 similar to that shown with respect to slot 57 in FIG. 7. Each ring may be comprised of a quarter or half segment as shown in the previous embodiments or may be a complete ring of resilient material which is temporarily deformed and snapped into position, interlocking with adjacent members by means of a groove and tab combination or other equivalent means. Rings 76–80 may be used either in a dish shaped rim, a spoked rim, or a ring shaped rim as described in each of the above embodiments.

FIG. 12 shows the wheel cover of FIG. 11 wherein ring 80 has been rotated with respect to its adjacent rings to effect a dramatic change in the visual pattern produced by the combination of rings. Again, each of rings 76–80 may be coupled to each other by any of the above described means, including: the tab and hole combination of FIG. 8; the edge and slot combination of FIG. 3; or any other equivalent means now known or later devised. The embodiment of FIGS. 11 and 12 allows for the creation of the new decorative pattern by relative rotation of the decorative segments as opposed to and in addition to the reversal, and to removal and replacement as suggested in the previously described embodiments.

FIG. 13 is a sectional view taken through lines 13—13 of FIG. 11. The peripheral portion of rim 20 is coupled to ring 76 by a tab 82 and groove 84 combination, of the same general type and design as previously described in connection with attachment of segment 24 to rim 20 of FIG. 3. Thus, ring 78 has a groove 84 formed at one end, and at the opposing end, a tab 86. Tab 86 similarly is disposed into a groove 88 of adjacent ring 80. Ring 80 is disposed into a shoulder 90 defined in ring 76 so that the surface of ring 80 may be flush with the surface of adjacent ring 76. Similarly, the opposing end of ring 80 forms a tab 92 disposed into a mating groove 94 of ring 78. Again, ring 80 defines a shoulder 96 so that rings 78 and 80 form a flush surface. Finally, the opposing end of ring 78 forms a tab 98 which fits into a hub of the same type as shown in FIG. 3, namely a hub comprised of center elements 32a and 32b fastened by bolt 34. The collective radius of rings 76–80 is slightly larger than the distance between peripheral portion of rim 20 and the lowermost surface of shoulder 40 of center element 32b. Therefore, rings 76–80 are compressed to an extent when center elements 32a and 32b are fastened together by means of bolt 34. Inasmuch as rings 76 ∝ 80 are substantially incompressible in the radial direction, but do have a degree of flexibility in the axial direction perpendicular to the plane of rim 20, rings 76–80 will be bowed outwardly or inwardly to a slight degree. This flexure will cause rings 76–80 to remain under compression when joined together and secured by center elements 32a and 32b. In this manner, the relative orientation of rings 76–80 with respect to each other is fixed. When altering the pattern formed by rings 76–80 from that shown in FIG. 11 to that shown in FIG. 12, bolt 34 is loosened and center element 32b and 32a parted, at least to an extent, thereby removing the compression on rings 76–80. The rings are then free to rotate with respect to each other. When the desired pattern is arranged, center elements 32a and 32b are again tightly fastened by bolt 34, thereby putting rings 76–80 once again under compression in fixing their relative position.

It is also included within the scope of the present invention that rings 76–80 may be employed upon a rim of the type illustrated and described in connection with FIGS. 6–9, namely a rim having an integrally formed center portion. In that case, rings 76–80 will be flexed and snapped into position between the periphery of the rim and its integrally formed and contiguous center element.

Figure 14:
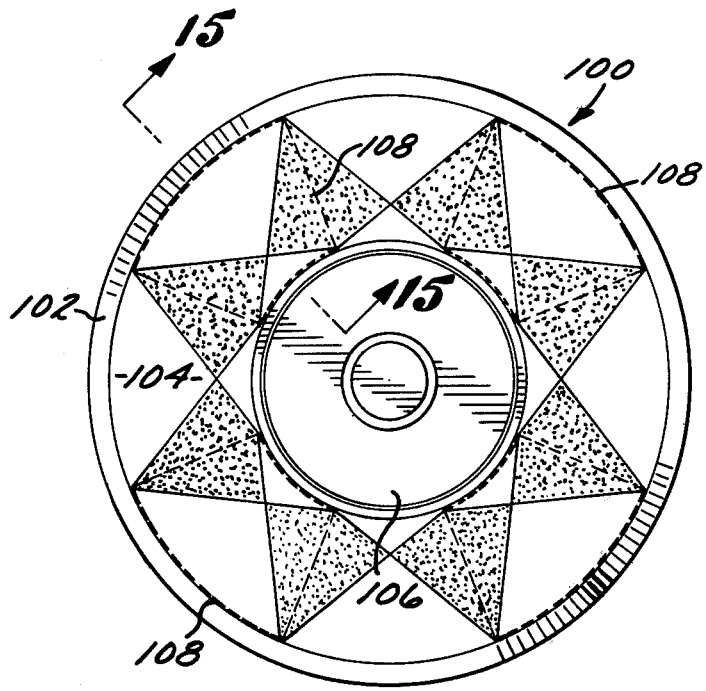
FIG. 14 is a side view of a sixth embodiment showing a decorative underlying pattern of the wheel covering.

FIG. 14 illustrates a sixth embodiment of the invention wherein a rim 100 is provided which is dish-shaped so that peripheral portion 102 is connected along all radii by an integral portion 104 with center element 106. As better shown in FIG. 15, dish-shaped rim 100 of FIG. 14 has a similar cross section to that of rim 48 as shown in FIG. 7, however, instead of spokes 52 connecting peripheral portion 50 of rim 48 with center portion 54, the entire intervening area between peripheral portion 102 and center element 106 is filled in by intermediate portion 104.

Figure 15:
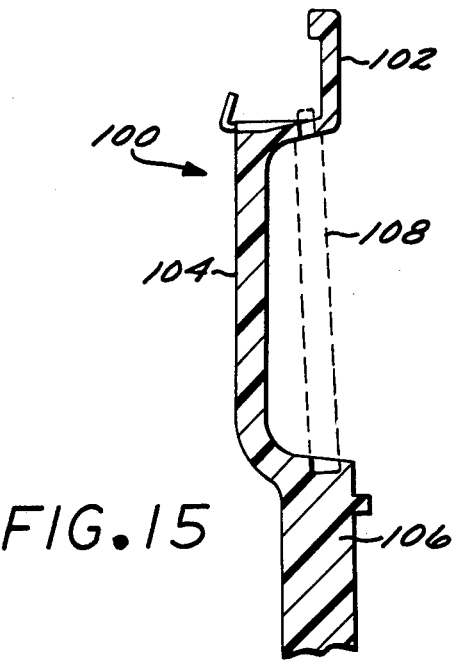
FIG. 15 is a sectional view taken through lines 15—15 of FIG. 14.

Therefore, according to the present invention, portion 104 is also provided with a third decorative pattern which can include three dimensional moldings over which a plurality of segments 108, shown in dotted outline in FIGS. 14 and 15, may be disposed. For the sake of simplicity, the coupling of segments 108 to rim 100 is shown as using the same design as that described in connection with FIGS. 6–9. Therefore, in addition to varying the number, type and disposition of segments 108 on rim 100, the deletion of segments 108 can also be used to affect the appearance by revealing the underlying pattern on surface 104.

It must be understood that many modifications and alterations may be made by those having ordinary skill in the art without departing from the spirit and scope of the present invention. The illustrated embodiments have been shown and described only for the purposes of clarification and should not be taken as limiting the scope of the following claims.

I claim:

1. A decorative cover for an automotive wheel comprising:

a rim including means for engaging said wheel;

a plurality of decorative segments selectively disposable relative to said rim, whereby disposition of said plurality of segments with respect to each other and to said rim may be arbitrarily varied to create a multiplicity of decorative patterns, with each of said plurality of segments being reversible with respect to said rim and with respect to each other whereby said multiplicity of patterns may be multiplied by both arbitrary disposition of said plurality of segments with respect to said rim and with respect to each other as well as arbitrary reversal of said segments with respect to said rim and with respect to each other;

a center element coaxial with said rim;

first coupling means on the radial outer edge of said segments that are releasably engaged with complementary radially extending coupling means formed on the inner circumferential edge of said rim; and second coupling means on the radial inner edge of said segments releasably engaged with complementary radially extending coupling means formed on the outer circumferential edge of said center element, said coupling means comprises a tab and groove arrangement.

2. A decorative cover as set forth in claim 1, wherein said plurality of segments are a plurality of interlocking rings of increasing diameter, one of said plurality of rings having the greatest diameter and interlocking with said rim, one of said plurality of rings having the smallest diameter interlocking with said center element, each ring with a diameter between said greatest and smallest diameter interlocking with one of said plurality of rings with the next smaller and interlocking with one of said plurality of rings with the next greater diameter.

3. A decorative cover as set forth in claim 1, wherein said rim includes a decorative intermediate portion between said circumferential edge of said rim and said center element whereby said cover presents a decorative pattern even when one or more of said plurality of decorative segments are removed from said rim.

4. A decorative cover as set forth in claim 1, wherein a plurality of sets of decorative segments are provided with each set of decorative segments being coupled to said rim and selectively disposable relative to said rim and to each other segment within said set, and wherein the segments from one of said plurality of sets of decorative segments may be coupled to said rim in combination with decorative segments from another one of said sets of decorative segments, each segment from each of said sets being selectively disposable relative to said rim and to each other segment, whereby disposition of selected ones of said segments from said plurality of sets of decorative segments may be arbitrarily varied within each set and among said plurality of sets to create a multiplicity of decorative patterns.

5. A decorative cover as set forth in claim 1, wherein the thickness of said segments is slightly greater than the depth of said opening means, and said segments are of flexible material whereby they may be slightly deformed to be positioned between said rim and said center element.

6. A decorative cover as set forth in claim 3, wherein each one of said plurality of rings is rotatable with respect to each adjacent one of said plurality of rings.

7. A decorative cover as set forth in claim 5, wherein each of said segments is reversible with respect to said rim and with respect to each other whereby said multiplicity of patterns may be multiplied both by arbitrary disposition of said segments selected from said plurality of sets, as well as arbitrary reversal of said segments with respect to said rim and with respect to each other.

8. A decorative cover as set forth in claim 5, wherein said rim includes a circumferential portion, a center portion, and an intermediate portion integrally disposed between said circumferential and center portions, wherein said intermediate portion has a decorative pattern formed thereon whereby said multiplicity of patterns may be further multiplied by selective removal of at least one of said segments from said rim thereby revealing said decorative pattern on said intermediate portion.

9. A decorative cover as set forth in claim 1, wherein the intermediate portion of said rim is disk-shaped.

10. A decorative cover as set forth in claim 5, wherein a plurality of sets of decorative segments are provided, with each set of decorative segments being coupled to said rim and selectively disposable relative to said rim and to each other segment within said set, and wherein the segments from one of said plurality of sets of decorative segments may be coupled to said rim in combination with decorative segments from another one of said sets of decorative segments, each segment from each of said sets being selectively disposable relative to said rim and to each other segment, whereby disposition of selected ones of said segments from said plurality of sets of decorative segments may be arbitrarily varied within each set and among said plurality of sets to create a multiplicity of decorative patterns.

* * * * *

Disclaimer 4,441,762.—*William J. Segal*, Culver City, Calif. DECORATIVE WHEEL COVERING FOR PROVIDING A MULTIPLICITY OF DESIGNS. Patent dated Apr. 10, 1984. Disclaimer filed Mar. 29, 1989, by the assignee, Mr. Gasket Co.

Hereby enters this disclaimer to the entire term of said patent.

[*Official Gazette May 23, 1989*]